(12) United States Patent
Takamine et al.

(10) Patent No.: US 10,712,318 B2
(45) Date of Patent: Jul. 14, 2020

(54) SENSOR ADHESION STATE DETERMINATION SYSTEM, SENSOR ADHESION STATE DETERMINATION DEVICE, AND SENSOR ADHESION STATE DETERMINATION METHOD

(71) Applicant: Kabushiki Kaisha Toshiba, Tokyo (JP)

(72) Inventors: Hidefumi Takamine, Tokyo (JP); Kazuo Watabe, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 119 days.

(21) Appl. No.: 15/916,528

(22) Filed: Mar. 9, 2018

(65) Prior Publication Data

US 2018/0266998 A1 Sep. 20, 2018

Related U.S. Application Data

(63) Continuation of application No. PCT/JP2018/002486, filed on Jan. 26, 2018.

(30) Foreign Application Priority Data

Mar. 17, 2017 (JP) .................. 2017-053719

(51) Int. Cl.
  *G01N 29/14* (2006.01)
  *G01N 29/44* (2006.01)
  *G01N 29/12* (2006.01)
  *G10K 11/00* (2006.01)

(52) U.S. Cl.
  CPC ............. *G01N 29/14* (2013.01); *G01N 29/12* (2013.01); *G01N 29/4409* (2013.01); *G01N 29/4427* (2013.01); *G01N 29/4436* (2013.01); *G01N 29/4454* (2013.01); *G10K 11/004* (2013.01)

(58) Field of Classification Search
  CPC .... G01N 29/14; G01N 29/12; G01N 29/4409; G01N 29/4436; G01N 29/4427; G01N 29/4454; G10K 11/004
  USPC .......................... 73/582, 579, 588, 632, 644
  See application file for complete search history.

(56) References Cited

U.S. PATENT DOCUMENTS

| | | | |
|---|---|---|---|
| 5,895,855 A * | 4/1999 | Ishikawa .................. | A61B 8/08 310/320 |
| 6,591,681 B1 * | 7/2003 | Shimada .............. | G01N 29/045 73/600 |
| 2009/0015265 A1 | 1/2009 | Meki | |

FOREIGN PATENT DOCUMENTS

| JP | 04-301762 A | 10/1992 |
|---|---|---|
| JP | 2003-173897 A | 6/2003 |
| JP | 2005-83752 A | 3/2005 |

(Continued)

*Primary Examiner* — Daniel S Larkin
*Assistant Examiner* — Anthony W Megna Fuentes
(74) *Attorney, Agent, or Firm* — Finnegan, Henderson, Farabow, Garrett & Dunner, L.L.P.

(57) ABSTRACT

According to one embodiment, a sensor adhesion state determination system includes a plurality of sensors, a calculator, and a determiner. Each of the plurality of sensors detects elastic waves. The calculator calculates peak frequencies of the elastic waves on the basis of the elastic waves detected by the plurality of sensors. The determiner determines the adhesion state of each of the sensors by comparing the peak frequencies with information serving as a determination reference.

8 Claims, 6 Drawing Sheets

(56) References Cited

FOREIGN PATENT DOCUMENTS

WO WO 2007/080692 A1 7/2007

* cited by examiner

31

32

SENSOR ADHESION STATE DETERMINATION SYSTEM, SENSOR ADHESION STATE DETERMINATION DEVICE, AND SENSOR ADHESION STATE DETERMINATION METHOD

CROSS-REFERENCE TO RELATED APPLICATION

This is a Continuation Application of International Application No. PCT/JP2018/002486, filed on Jan. 26, 2018, which claims priority to Japanese Patent Application No. 2017-053719, filed on Mar. 17, 2017, and the entire contents of all of the aforementioned applications are incorporated herein by reference.

FIELD

Embodiments described herein relate generally to a sensor adhesion state determination system, a sensor adhesion state determination device, and a sensor adhesion state determination method.

BACKGROUND

Structures generate acoustic emissions (AEs) due to development of cracks, friction, or the like inside the structures. AEs are elastic waves that are generated due to development of fatigue cracks of a material. Internal deterioration of a structure can be evaluated by detecting AEs by sensors installed on surfaces of the structure and analyzing signals obtained through the detection. Usually, sensors are adhered to the surfaces of a structure which is to be subjected to degradation evaluation with an adhesive or the like. However, the adhesion of sensors may be insufficient due to defective adhesion work, changes over time, or the like. Such insufficient adhesion may lead to a reduction in the accuracy of deterioration evaluation of the structure or lead to misdiagnosis. Moreover, sensors adhered insufficiently may be at a risk falling off of the surfaces of the structure and thus there is a need to take safety measures.

DETAILED DESCRIPTION

An object to be achieved by the present invention is to provide a sensor adhesion state determination system, a sensor adhesion state determination device, and a sensor adhesion state determination method which can determine the adhesion states of sensors adhered to a structure.

According to one embodiment, a sensor adhesion state determination system includes a plurality of sensors, a calculator, and a determiner. Each of the plurality of sensors is configured to detect elastic waves. The calculator is configured to calculate peak frequencies of the elastic waves on the basis of the elastic waves detected by the plurality of sensors. The determiner is configured to determine an adhesion state of each of the sensors by comparing the peak frequencies with information serving as a determination reference.

Hereinafter, a sensor adhesion state determination system, a sensor adhesion state determination device, and a sensor adhesion state determination method according to embodiments will be described with reference to the drawings.

First Embodiment

Figure 1:
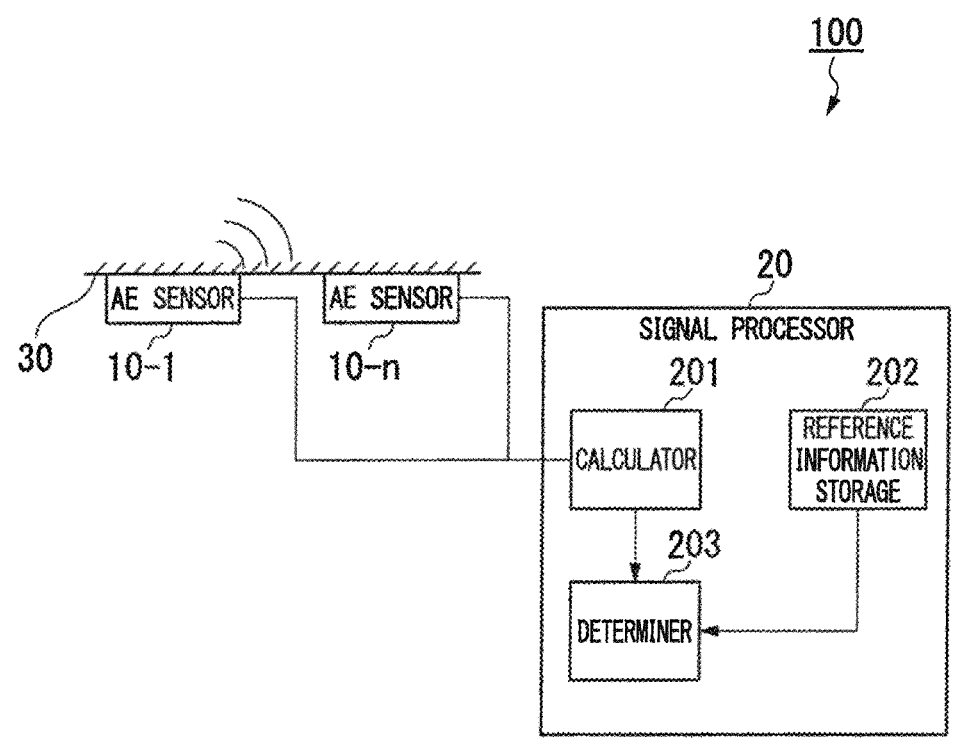
FIG. 1 is a diagram showing a system configuration of a sensor adhesion state determination system according to a first embodiment.

FIG. 1 is a diagram showing a system configuration of a sensor adhesion state determination system 100 according to a first embodiment. The sensor adhesion state determination system 100 is used to determine the adhesion state of a sensor adhered to a structure. In the present embodiment, a bridge will be described as an example of the structure, but the structure is not necessarily limited to a bridge. For example, the structure may be of any type as long as it is a structure that generates elastic waves due to occurrence or development of cracks or due to an external impact (for example, rain, artificial rain, or the like). Bridges are not limited to structures that are laid over rivers and valleys but also include various structures provided above ground (for example, highway overpasses).

The sensor adhesion state determination system 100 includes a plurality of AE sensors 10-1 to 10-$n$ (where n is an integer of 2 or more) and a signal processor 20. The AE sensors 10-1 to 10-$n$ and the signal processor 20 are connected such that they can communicate with each other by wire or wirelessly. In the following description, the AE sensors 10-1 to 10-$n$ will be referred to as AE sensors 10 when they are not distinguished.

The AE sensors 10 are adhered to a surface of the structure which is to be subjected to deterioration evaluation with an adhesive or the like. For example, the AE sensors 10 are adhered to a concrete floor slab 30 of the bridge. Each of the AE sensors 10 has an oscillation function to generate elastic waves having a specific frequency and a detection function to detect elastic waves generated from the structure. That is, the AE sensor 10 has a combination of an oscillating unit and a detecting unit as a measuring device. The oscillation function is a function of oscillating at a specific frequency to generate pulses of elastic s at the adhesion portion between the AE sensor 10 and the surface of the structure. The elastic waves generated by the oscillation function of the AE sensor 10 propagate through the structure.

The AE sensor 10 may perform oscillation at a preset time, at intervals of a preset period, or when an instruction is made by a user. The AE sensor 10 has a piezoelectric element, detects an elastic wave generated from the structure, and converts the detected elastic wave into a voltage signal (an AE source signal). The AE sensor 10 performs processing such as amplification and frequency limiting on the AE source signal and outputs the processed signal to the signal processor 20. An acceleration sensor may be used instead of the AE sensor 10. In this case, the acceleration sensor performs the same processing as that of the AE sensor 10 and outputs the processed signal to the signal processor 20.

The signal processor 20 receives the AE source signals processed by the AE sensors 10 as inputs. The signal processor 20 determines the adhesion state of the oscillating AE sensor 10 on the basis of frequencies obtained from the input AE source signals. For example, the signal processor 20 determines whether the adhesion of the AE sensor 10 is in a good state or in a defective state. The signal processor 20 functions as a sensor adhesion state determination device. The signal processor 20 holds identification information of all AE sensors 10 connected to the signal processor 20.

Next, the functional configuration of the signal processor 20 will be described.

The signal processor 20 includes a central processing unit (CPU), a memory, an auxiliary storage device, or the like connected via buses and executes an adhesion state determination program. By executing the adhesion state determination program, the signal processor 20 functions as a device including a calculator 201, a reference information storage 202, and a determiner 203. It is to be noted that all or a part of each of the functions of the signal processor 20 may be realized using hardware such as an application specific integrated circuit (ASIC), a programmable logic device (PLD), or a field programmable gate array (FPGA). The adhesion state determination program may be recorded in a computer readable recording medium. The computer readable recording medium is, for example, a storage device such as a flexible disk, a magneto-optical disk, a ROM, a portable medium such as a CD-ROM, or a hard disk installed in a computer system. The adhesion state determination program may also be transmitted and received via an electric communication line.

The calculator 201 calculates a peak frequency from the input AE source signal.

The reference information storage 202 is configured using a storage device such as a magnetic hard disk device or a semiconductor storage device. The reference information storage 202 stores information of a reference range. The reference range indicates a peak frequency range from which it is possible to determine whether or not the adhesion is in a good state. The reference angle may be set appropriately. The reference information storage 202 may store information of the reference range for each sensor type.

The determiner 203 determines the adhesion state of the oscillating AE sensor 10 on the basis of both the peak frequency of each AE sensor 10 calculated by the calculator 201 and the reference range.

Figure 2:
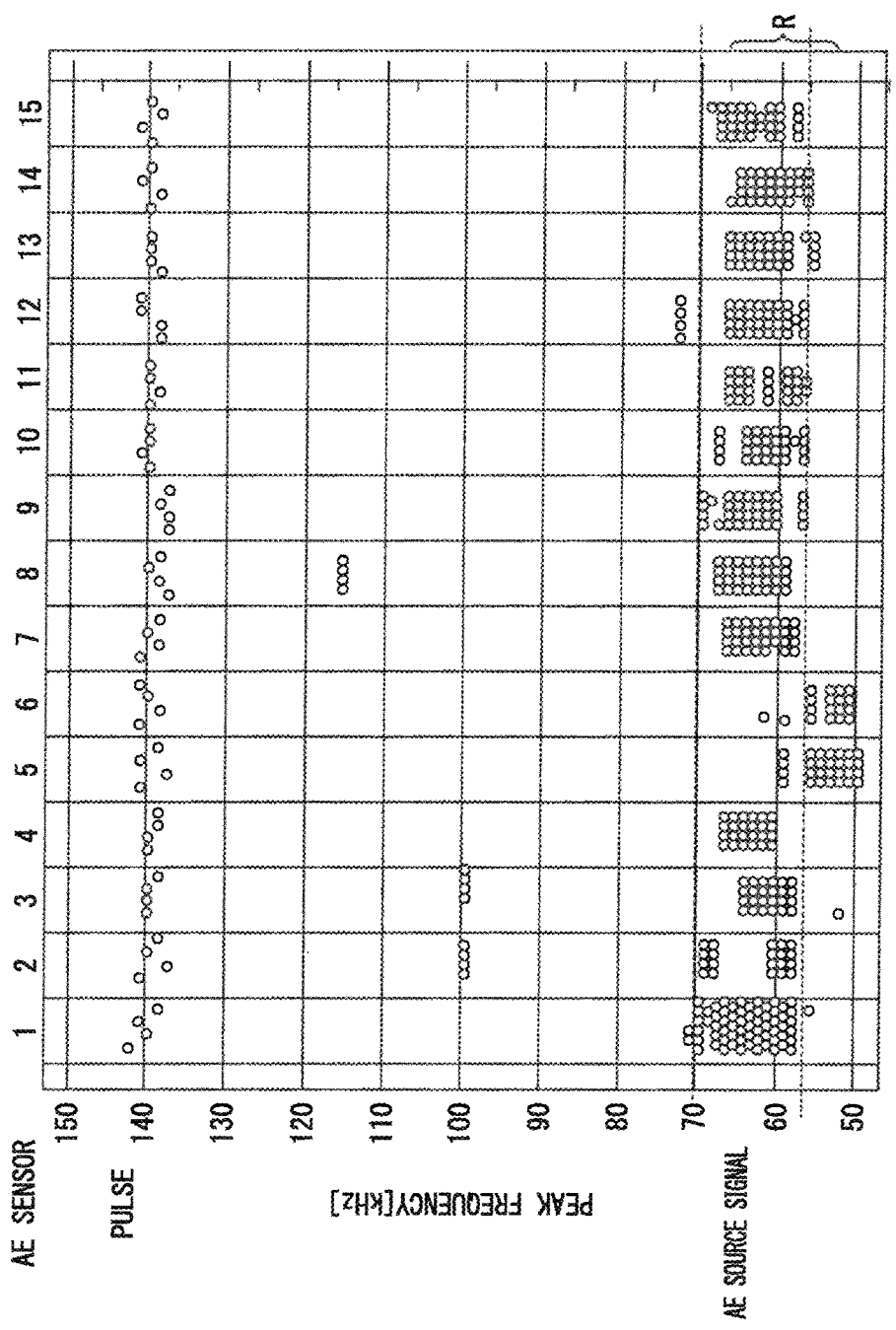
FIG. 2 is a view showing an example of data obtained by measurement.

FIG. 2 is a diagram showing an example of data obtained by measurement. The data shown in FIG. 2 is data regarding all AE sensors 10 which is obtained by adhering fifteen AE sensors 10 to a surface of a structure and causing the AE sensors 10 to sequentially oscillate. The horizontal axis represents the oscillating AE sensors 10 and the vertical axis represents peak frequencies. FIG. 2 shows an example in which pulses of elastic waves are emitted as each of the AE sensors 10 sequentially oscillates at regular intervals. A dot sequence shown near a peak frequency of 140 kHz represents pulses of elastic waves generated by oscillation of each of the AE sensors 10. A dot sequence shown at peak frequencies 50 kHz to 120 kHz represents peak frequencies obtained from AE source signals based on elastic waves detected by the other AE sensors 10. In FIG. 2, R represents a reference range. Although the AE source signals have peak frequencies of about 60 kHz, the peak frequencies vary due to the influence of the positional relationship of the AE sensors 10 or the like.

Among the AE sensors 10 shown in FIG. 2, an AE sensor 10 indicated by "5" and an AE sensor 10 indicated by "6" are in an insufficient adhesion state although they can detect signals. From FIG. 2, it can be seen that when an elastic wave is generated by oscillation of an AE sensor 10 which is in a defective adhesion state, peak frequencies based on elastic waves as which the other AE sensors 10 has detected the generated elastic wave are below a reference range R. Thus, it is possible to determine the state of the oscillating AE sensor 10 using peak frequencies of elastic waves as which the other AE sensors 10 have detected the elastic wave generated by oscillation of the AE sensor 10. In the following description, it is assumed that the distribution data shown in FIG. 2 is a frequency distribution.

Figure 3:
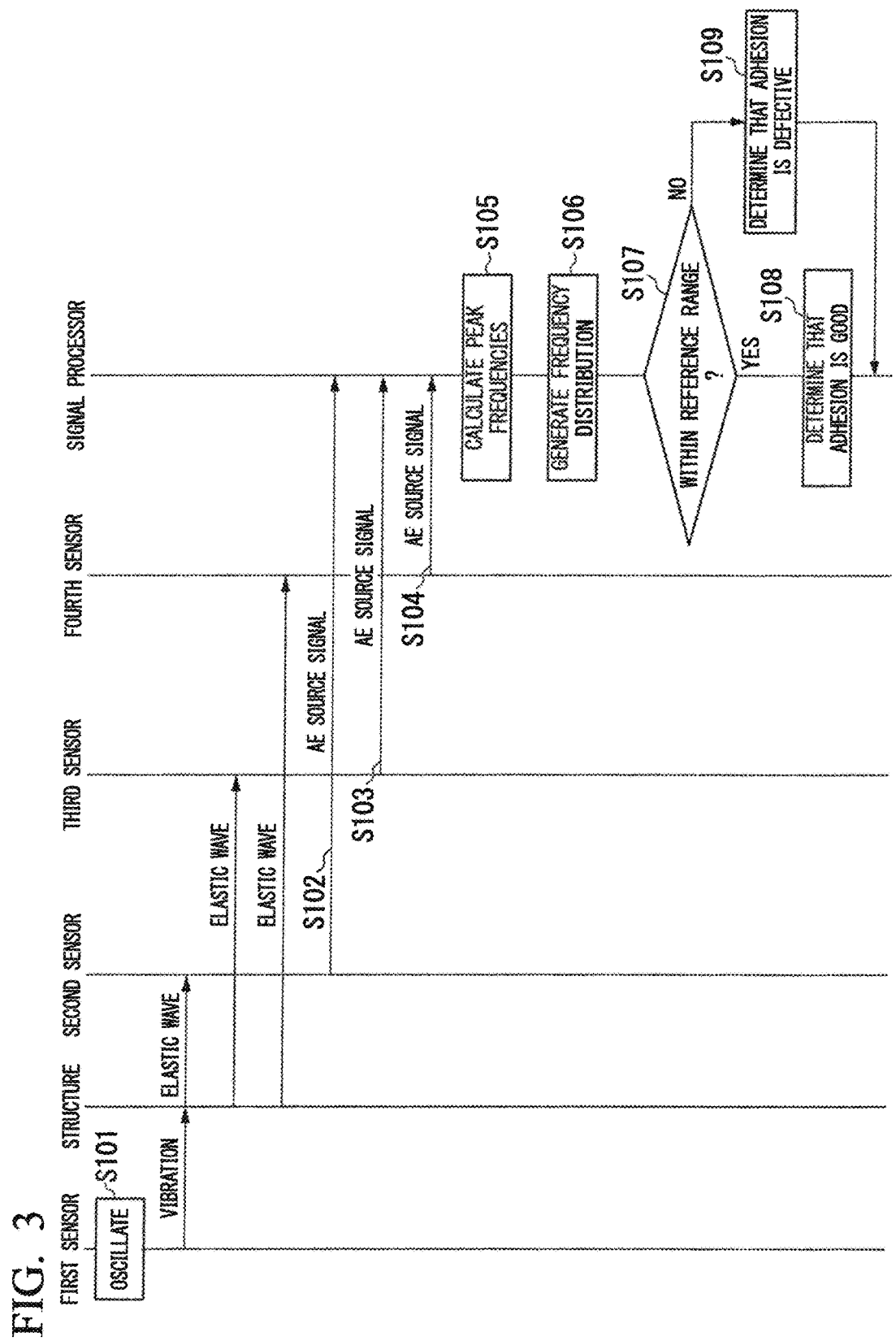
FIG. 3 is a sequence diagram showing a process flow for a sensor adhesion state determination system according to the first embodiment.
Figure 4:
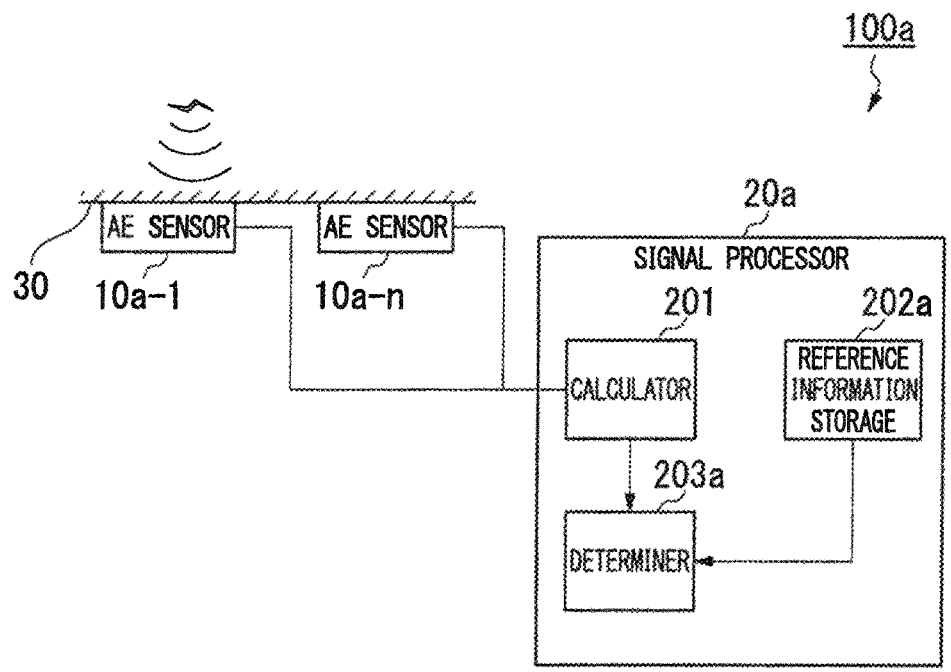
FIG. 4 is a diagram showing a system configuration of a sensor adhesion state determination system according to a second embodiment.

FIG. 3 is a sequence diagram showing a process flow for the sensor adhesion state determination system 100 according to the first embodiment. In FIG. 3, the case in which there are four AE sensors 10 will be described as an example. In FIG. 4, the four AE sensors 10 will be described as a first sensor, a second sensor, a third sensor, and a fourth sensor.

The first sensor oscillates at a specific frequency (step S101). Vibration is transmitted to the structure due to the oscillation of the first sensor and pulses of elastic waves are generated from the structure due to the vibration. Pulses (elastic waves) generated from the structure propagate through the structure and are detected by the second to fourth sensors. The second sensor converts the detected elastic waves into an AE source signal, performs processing on the AE source signal, and outputs the processed signal to the signal processor 20 (step S102). The third sensor converts the detected elastic waves into an AE source signal, performs processing on the AE source signal, and outputs the processed signal to the signal processor 20 (step S103). The fourth sensor converts the detected elastic waves into an AE, source signal, performs processing on the AE source signal, and outputs the processed signal to the signal processor 20 (step S104).

The calculator 201 receives the AE source signals output from the sensors as inputs. The calculator 201 calculates peak frequencies f2, f3 and f4 from the input AE source signals (step S105). The peak frequency f2 indicates a peak frequency of the AE source signal output from the second sensor. The peak frequency f3 indicates a peak frequency of the AE source signal output from the third sensor. The peak frequency f4 indicates a peak frequency of the AE source signal output from the fourth sensor. The calculator 201 outputs the calculated peak frequencies f2, f3, and f4 to the determiner 203. The determiner 203 generates a frequency distribution on the basis of the peak frequencies f2, f3 and f4 output from the calculator 201 (step S106). That is, the determiner 203 generates a frequency distribution with a horizontal axis representing the first sensor and a vertical axis representing the peak frequency. In this case, the determiner 203 plots peak frequencies corresponding to the peak frequencies f2, f3 and f4 output from the calculator 201 at the positions of the peak frequencies. When a pulse is emitted a plurality of times from the first sensor, the determiner 203 performs the same processing the plurality of times. Through this processing, the determiner 203 generates a frequency distribution as shown in FIG. 2.

Thereafter, the determiner 203 determines whether or not the peak frequencies f2, f3, and f4 in the frequency distribution are within the reference range on the basis of both the generated frequency distribution and the information of the reference range stored in the reference information storage 202 (step S107). When the peak frequencies f2, f3 and f4 are within the reference range (YES in step S107), the determiner 203 determines that the adhesion of the first sensor is good (step S108). That is, the determiner 203 determines that the adhesion of first sensor is in a good state.

On the other hand, when the peak frequencies f2, f3 and f4 are not within the reference range (NO in step S107), the determiner 203 determines that the adhesion of the first sensor is defective (step S109). That is, the determiner 203 determines that the adhesion of the first sensor is in a defective state.

The sensor adhesion state determination system 100 performs the processing of FIG. 3 for each AE sensor 10. For example, when the second sensor emits a pulse, the signal processor 20 determines the adhesion state of the second sensor on the basis of elastic waves detected by the first sensor, the third sensor, and the fourth sensor. The method of determining the adhesion state is the same as described above.

According to the sensor adhesion state determination system 100 configured as described above, the signal processor 20 calculates peak frequencies from AE source signals based on elastic waves detected by the AE sensors 10, determines that the adhesion state of the oscillating AE sensor 10 is good when the calculated peak frequencies are within the reference range, and determines that the adhesion state of the oscillating AE sensor 10 is defective when the calculated peak frequencies are not within the reference range. Therefore, it is possible to determine the adhesion state of each sensor adhered to the structure.

Modified examples of the sensor adhesion state determination system 100 will be described below.

In the present embodiment, the determiner 203 generates the frequency distribution. However, the determiner 203 may not generate the frequency distribution. In this case, on the basis of peak frequencies calculated by the calculator 201 and a reference range, the determiner 203 determines whether or not the peak frequencies are within the reference range.

When a specific number of (for example, two or three) peak frequencies among the plurality of peak frequencies are not within the reference range, the determiner 203 determines that the adhesion of the oscillating AE sensor 10 is defective.

Adoption of this configuration eliminates the possibility of the adhesion of the oscillating AE sensor 10 being determined to be defective based only on one value which is not within the reference range due to noise mixing or the like. Therefore, it is possible to perform the determination more accurately.

The determiner 203 may also determine the adhesion state on the basis of a statistical value of peak frequencies. The statistical value is, for example, an average value, a mode value, a median value, or the like. When the adhesion state is determined on the basis of the average value of peak frequencies, the reference information storage 202 stores information of a reference range of the average value. In this case, the determiner 203 compares the average value of the peak frequencies with the reference range of the average value, determines that the adhesion of the oscillating AE sensor 10 is good when the average value of the peak frequencies is within the reference range of the average value, and determines that the adhesion of the oscillating AE sensor 10 is defective when the average value of the peak frequencies is not within the reference range of the average value.

The determiner 203 may also calculate respective distributions of frequencies of detection signals of AE sensors 10 which are obtained by oscillations of the AE sensors 10, compare the calculated distributions, and determine that the adhesion of an AE sensor 10 is defective when a deviation of the calculated distribution of the AE sensor 10 from the distributions of values of the other AE sensors 10 is greater than or equal to a threshold value.

The signal processor 20 may be configured to output the determination result. In this case, the signal processor 20 further includes a display unit. The display unit displays the determination result of the determiner 203. For example, the display unit may display information of the AE sensor 10 defectively adhered or may display the frequency distribution shown in FIG. 2.

With this configuration, the user of the sensor adhesion state determination system 100 can easily find the AE sensor 10 defectively adhered.

Second Embodiment

In a second embodiment, AE sensors have no oscillation function and detect elastic waves generated from the structure due to an external impact or load.

FIG. 4 is a diagram showing a system configuration of a sensor adhesion state determination system 100a according to the second embodiment. The sensor adhesion state determination system 100a is used to determine the adhesion states of sensors adhered to a structure. In the present embodiment, a bridge will be described as an example of the structure, but the structure is not necessarily limited to a bridge.

The sensor adhesion state determination system 100a includes a plurality of AE sensors 10a-1 to 10a-n and a signal processor 20a. The AE sensors 10a-1 to 10a-n and the signal processor 20a are connected such that they can communicate with each other by wire or wirelessly. In the following description, the AE sensors 10a-1 to 10a-n will be referred to as AE sensors 10a when they are not distinguished.

The AE sensors 10a are adhered to a surface of the structure which is to be subjected to deterioration evaluation with an adhesive or the like. For example, the AE sensors 10a are adhered to a concrete floor slab 30 of the bridge. Each of the AE sensors 10a has a detection function to detect elastic waves generated from the structure. The AE sensor 10a has a piezoelectric element, detects an elastic wave generated from a structure, and converts the detected elastic wave into a voltage signal (an AE source signal). The AE sensor 10a performs processing such as amplification and frequency limiting on the AE source signal and outputs the processed signal to the signal processor 20a. An acceleration sensor may be used instead of the AE sensor 10a. In this case, the acceleration sensor performs the same processing as that of the AE sensor 10a and outputs the processed signal to the signal processor 20a.

The signal processor 20a receives the AE source signals processed by the AE sensors 10a as inputs. The signal processor 20a determines the adhesion states of the AE sensors 10a on the basis of frequencies obtained from the input AE source signals. The signal processor 20a functions as a sensor adhesion state determination device. The signal processor 20a holds identification information of all AE sensors 10a connected to the signal processor 20a.

Next, the functional configuration of the signal processor 20a will be described.

The signal processor 20a includes a CPU, a memory, an auxiliary storage device, or the like connected via buses and executes an adhesion state determination program. By executing the adhesion state determination program, the signal processor 20a functions as a device including a calculator 201, a reference information storage 202a, and a determiner 203a. It is to be noted that all or a part of each of the functions of the signal processor 20a may be realized using hardware such as an ASIC, a PLD, or an FPGA. The adhesion state determination program may be recorded in a compute readable recording medium. The computer readable recording medium is, for example, a storage device such as a flexible disk, a magneto-optical disk, a ROM, a portable medium such as a CD-ROM, or a hard disk installed in a computer system. The adhesion state determination program may also be transmitted and received via an electric communication line.

The signal processor 20a differs in configuration from the signal processor 20 in that the signal processor 20a includes a reference information storage 202a and a determiner 203a instead of the reference information storage 202 and the determiner 203. The other components of the signal processor 20a are the same as those of the signal processor 20. Therefore, the overall description of the signal processor 20a will be omitted and the reference information storage 202a and the determiner 203a will be described below.

The reference information storage 202a is configured using a storage device such as a magnetic hard disk device or a semiconductor storage device. The reference information storage 202a stores information of the resonance frequencies of sensors and reference values. The reference information storage 202a may store information of the resonance frequencies of sensors for each sensor type. Each of the reference values is a value serving as a reference from which it is possible to determine whether or not the adhesion is in a good state. The reference value may be set appropriately.

The determiner 203a determines the adhesion state of each of the AE sensors 10a on the basis of the peak frequencies of the AE sensors 10a calculated by the calculator 201, the resonance frequency of the sensor, and the reference value.

Figure 5:
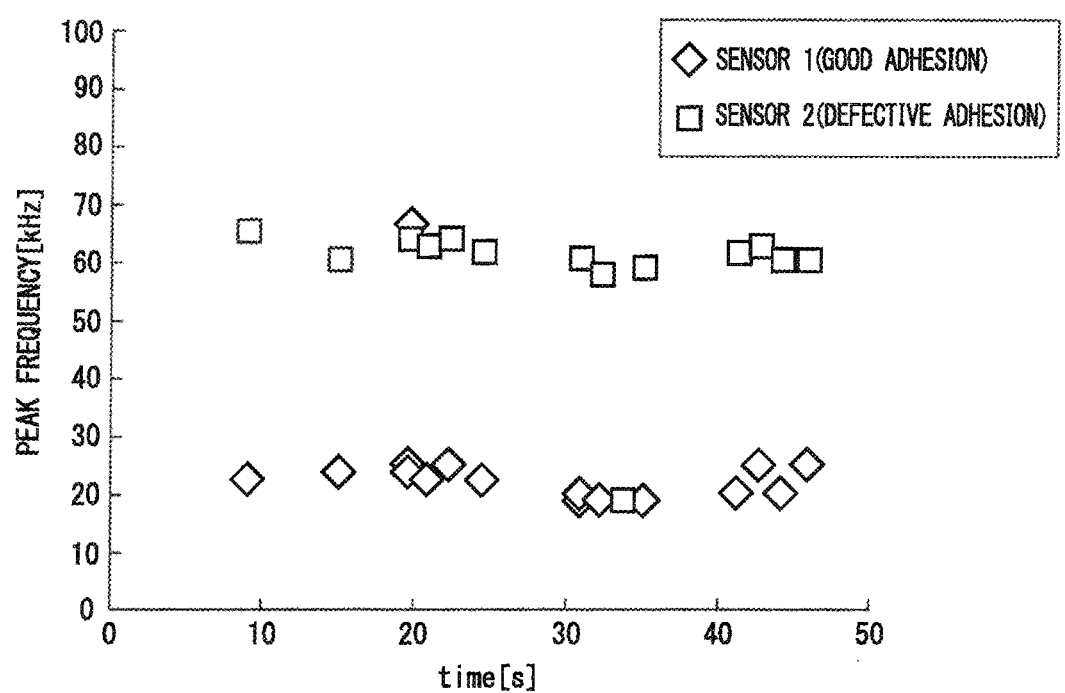
FIG. 5 is a view showing an example of data obtained by measurement.

FIG. 5 is a diagram showing an example of data obtained by measurement. The data of FIG. 5 is obtained by adhering two AE sensors 10a (sensor 1 and sensor 2) to a surface of a structure and allowing the sensors 1 and 2 to detect elastic waves generated due to an external impact or load applied to the structure, in FIG. 5, the horizontal axis represents time and the vertical axis represents the peak frequency. FIG. 5 is a plot of peak frequencies of AE source signals obtained when an impact is intermittently applied to the structure. In the example shown in FIG. 5, the sensor 1 is in a good adhesion state and the sensor 2 is in a defective adhesion state.

As shown in FIG. 5, the distributions of peak frequencies of the sensor 1 and the sensor 2 are different. The AE sensors 10a used here have a resonance frequency of 60 kHz. Many elastic waves having peak frequencies in a range of 20 to 30 kHz which are main frequencies of elastic waves propagating in the structure are seen in the distribution of the sensor 1 which is in a good adhesion state. On the other hand, in the distribution of the sensor 2, only resonance components of the AE sensors 10a are dominant and peak frequencies of elastic waves concentrate around the resonance frequency of 60 kHz of the AE sensors 10a. The signal processor 20a compares peak frequencies seen in the distribution of peak frequencies of elastic waves detected by each AE sensor 10a with the resonance frequency of the AE sensor 10a that has detected the elastic waves and determines that adhesion of the AE sensor 10a is defective when the comparison result is that the proportion of elastic waves having peak frequencies substantially matching the resonance frequency is greater than or equal to the reference value. Here, "substantially matching" indicates that the difference between the values compared (for example, the peak frequency and the resonance frequency) is ±several KHz (for example, ±5 kHz).

Figure 6A:
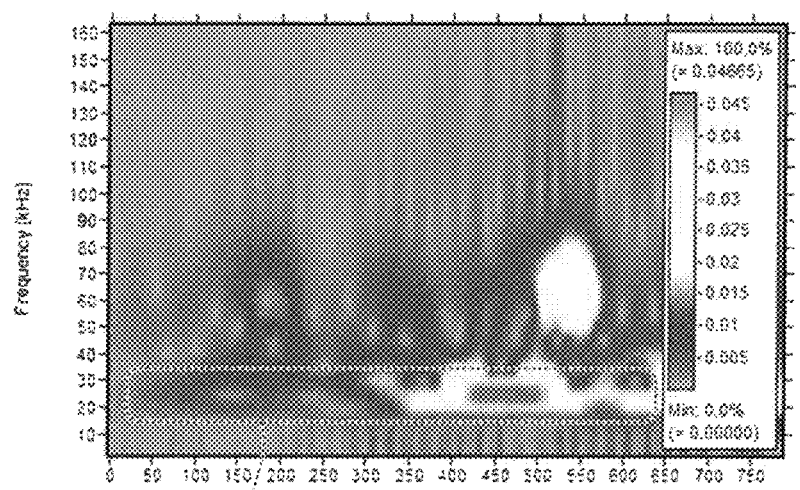
FIG. 6A is a diagram showing a result of performing wavelet transformation.
Figure 6B:
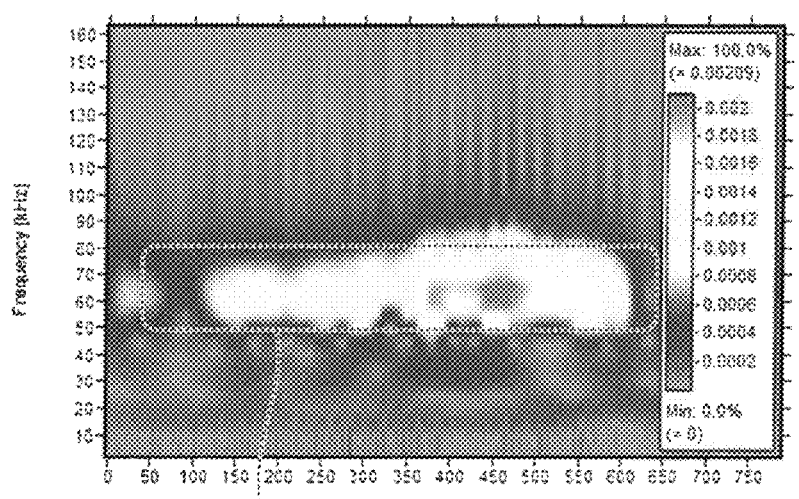
FIG. 6B is a diagram showing a result of performing wavelet transformation.

Further, defective adhesion can be detected more accurately by performing wavelet analysis. FIGS. 6A and 6B shows the results of performing wavelet transformation on respective extracted waveforms of the sensors 1 and 2 of FIG. 5. In FIGS. 6A and 6B, the horizontal axis represents time and the vertical axis represents frequency. Specifically, FIG. 6A is a diagram showing a result of performing wavelet transformation on one waveform of the sensor 1 which is in a good adhesion state. FIG. 6B is a diagram showing a result of performing wavelet transformation on one waveform of the sensor 2 which is in a defective adhesion state. As shown in FIG. 6A, a region having various frequency components including the range of 20 to 30 kHz which are main frequencies of elastic waves propagating in the structure is seen in the result of the sensor 1 which is in a good adhesion state (see circle 31 in FIG. 6A). On the other hand, as shown in FIG. 6B, the positions of peak frequencies of the sensor 2 which is defectively adhered are stable around the resonance frequency of the sensor, i.e., 60 kHz, over the entire frequency range (see circle 32 in FIG. 6B). When elastic waves detected by the AE sensor 10a have been wavelet-transformed, the signal processor 20a can determine that adhesion of the AE sensor 10a is defective if the proportion of detected elastic waves having peak frequencies stable around the resonance frequency of the sensor is more than the reference value. That is, when the proportion of elastic waves whose peak frequencies substantially match the resonance frequency during a period of time greater than or equal to a predetermined ratio among the elastic waves detected by the AE sensor 10a is greater than or equal to the reference value, the determiner 203a can determine that adhesion of the AE sensor 10a is defective. Incidentally, the structure described with reference to FIGS. 5 and 6 is concrete.

Figure 7:
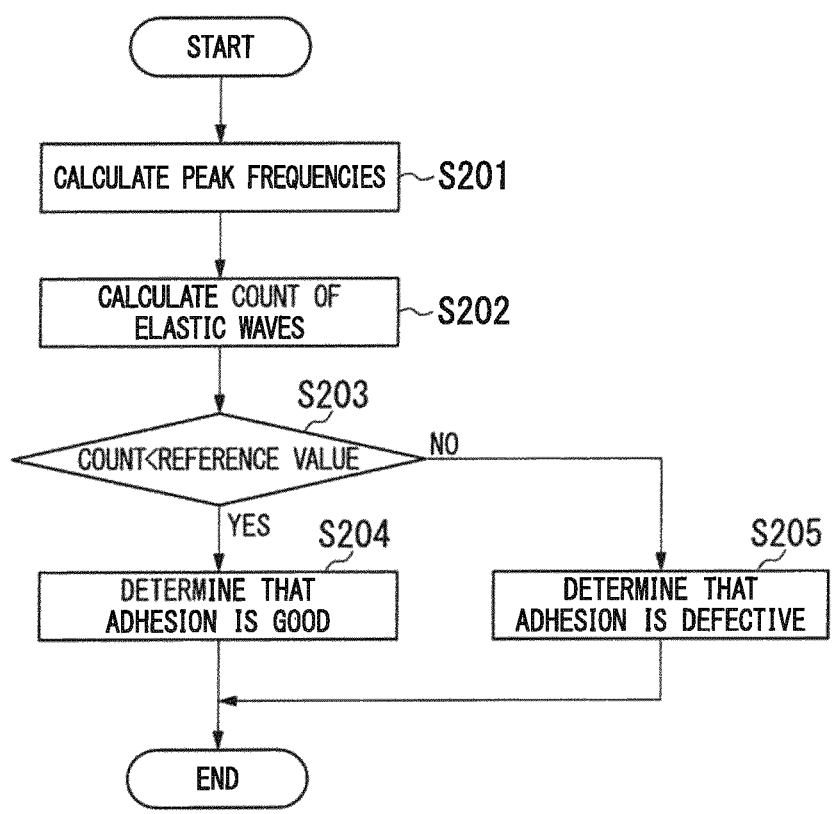
FIG. 7 is a flowchart showing a process flow for a signal processor according to the second embodiment.

FIG. 7 is a flowchart showing a process flow for the signal processor 20a in the second embodiment. The description of FIG. 7 will be given with reference to the case in which elastic waves detected by one AE sensor 10a among a plurality of AE sensors 10a are used as an example. In FIG. 7, the AE sensor 10a will be described as a first sensor.

The calculator 201 calculates peak frequencies frond elastic waves obtained by the first sensor (step S201). The calculator 201 outputs the calculated peak frequencies to the determiner 203a. Next, the determiner 203a compares the calculated peak frequencies with the resonance frequency of the AE sensor 10a. For example, the determiner 203a determines whether or not the difference between each of the calculated peak frequencies and the resonance frequency of the sensor is less than or equal to a predetermined allowable value δ (for example, several kHz). Further, the determiner 203a calculates the count of elastic waves having a frequency difference of δ or less among the obtained elastic waves (step S202).

Then, the determiner 203a compares the calculated count with a reference value stored in the reference information storage 202a and determines whether or not the count is less than the reference value (step S203). When the count is less than the reference value (step S203: YES), the determiner 203a determines that adhesion of the first sensor is good (step S204). That is, the determiner 203a determines that the first sensor is in a good adhesion state.

On the other hand, when the count is less than the reference value (step S203: NO), the determiner 203a determines that adhesion of the first sensor is defective (step S205). That is, the determiner 203a determines that the first sensor is in a defective adhesion state.

In the present embodiment, when the resonance frequency of the AE sensors 10a substantially match the peak frequencies of dominant elastic waves in the structure which is to be measured, adhesion of the sensors makes small differences in the peak frequencies. Therefore, it is preferable that the AE sensors 10a used in the second embodiment be those having a resonance frequency different from the peak frequencies of dominant elastic waves in the structure which is to be measured.

According to the sensor adhesion state determination system 100a configured as described above, the signal processor 20a calculates peak frequencies from AE source signals based on elastic waves detected by the AE sensors 10a. Then, the signal processor 20a compares the calculated peak frequencies with the resonance frequency of the AE sensors 10a, and determines that the adhesion state of an AE sensor 10a is good if the count of elastic waves whose peak frequencies differ from the resonance frequency of the AE sensor 10a by δ or less among elastic waves detected by the AE sensor 10a is less than the reference value and determines that the adhesion state of an AE sensor 10a is defective if the count of elastic waves whose peak frequencies differ from the resonance frequency of the AE sensor 10a by δ or less among elastic waves detected by the AE sensor 10a is greater than or equal to the reference value. Therefore, it is possible to determine the adhesion states of the sensors adhered to the structure.

According to at least of the embodiments described above, a plurality of sensors configured to detect elastic waves generated by a structure, a calculator configured to calculate peak frequencies of the elastic waves based on the elastic waves detected by the sensors, and a determiner configured to determine an adhesion state of each of the sensors by comparing the peak frequencies with information which is a reference for determination as to whether or not each of the sensors is in a good adhesion state are provided and thus it is possible to determine the adhesion state of each of the sensors adhered to the structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor adhesion state determination system comprising:
   a plurality of sensors configured to detect elastic waves;
   a calculator configured to calculate peak frequencies of the elastic waves on the basis of the elastic waves detected by the plurality of sensors; and
   a determiner configured to determine an adhesion state of each of the sensors to a structure by comparing the peak frequencies with information serving as a determination reference.

2. The sensor adhesion state determination system according to claim 1, wherein:
   each of the plurality of sensors has an oscillation function to oscillate at a specific frequency,
   at least one sensor of the plurality of sensors is an oscillated sensor which is oscillating by oscillation function,
   the calculator is configured to calculate peak frequencies of the elastic waves generated by oscillation on the basis of the elastic waves detected by the plurality of sensors different from the oscillated sensor, and
   the determiner is configured to determine an adhesion state of the oscillated sensor to the structure by comparing the peak frequencies with the information serving as the determination reference.

3. The sensor adhesion state determination system according to claim 2, wherein the determiner is configured to determine that adhesion of the oscillated sensor to the structure is defective when at least one of the peak frequencies of the elastic waves are not within a range of peak frequencies serving as the determination reference.

4. The sensor adhesion state determination system according to claim 1, wherein the determiner is configured to determine that adhesion of at least one sensor of the plurality of sensors to the structure is defective when a count of the peak frequencies substantially matching a resonance frequency of the at least one sensor is greater than or equal to a predetermined count.

5. The sensor adhesion state determination system according to claim 1, wherein the determiner is configured to determine that adhesion of at least one sensor of the plurality of sensors to the structure is defective when a proportion of elastic waves whose peak frequencies substantially match a resonance frequency during a period of time greater than or equal to a predetermined ratio among the elastic waves detected by the at least one sensor is greater than or equal to a reference value.

6. The sensor adhesion state determination system according to claim 1, wherein each of the plurality of sensors has a resonance frequency different from a main frequency of elastic waves propagating in the structure.

7. A sensor adhesion state determination device comprising:
   a calculator configured to calculate peak frequencies of elastic waves based on the elastic waves detected by a plurality of sensors configured to detect elastic waves; and
   a determiner configured to determine an adhesion state of each of the sensors to a structure by comparing the peak frequencies with information serving as a determination reference.

8. A sensor adhesion state determination method comprising:
   a calculation step to calculate peak frequencies of elastic waves based on the elastic waves detected by a plurality of sensors configured to detect elastic waves; and
   a determination step to determine an adhesion state of each of the sensors to a structure by comparing the peak frequencies with information serving as a determination reference.

* * * * *